Dec. 31, 1957     W. S. JOSEPHSON     2,818,287
ANNULAR SEALS

Filed April 20, 1955             4 Sheets-Sheet 1

Dec. 31, 1957 W. S. JOSEPHSON 2,818,287
ANNULAR SEALS
Filed April 20, 1955 4 Sheets-Sheet 2

Dec. 31, 1957 W. S. JOSEPHSON 2,818,287
ANNULAR SEALS
Filed April 20, 1955 4 Sheets-Sheet 3

Dec. 31, 1957   W. S. JOSEPHSON   2,818,287
ANNULAR SEALS
Filed April 20, 1955   4 Sheets-Sheet 4

United States Patent Office 2,818,287
Patented Dec. 31, 1957

2,818,287

ANNULAR SEALS

Walter S. Josephson, Schwenksville, Pa., assignor to Greene, Tweed & Co., North Wales, Pa.

Application April 20, 1955, Serial No. 502,557

3 Claims. (Cl. 286—26)

The present invention relates to annular seals, and is particularly directed to annular resilient, for example, rubber seals for preventing leakage of a fluid along a cylindrical surface, such as, the surface of a shaft or cylinder.

Generally, seals for preventing the leakage of a fluid under pressure along a cylindrical surface, such as, the surface of a shaft or cylinder, are either of the "squeeze" type or of the "lip" type. A seal of the "squeeze" type includes an annular member of deformable material, for example, rubber, which is radially compressed when in its operative position so that the sealing member is urged radially against the surface to be sealed and resists leakage of the fluid along the latter. However, the usefulness of a "squeeze" type seal is limited by higher initial (breakout) friction, relatively small sealing area subject to damage by abrasion or extrusion and the need for close clearances and non-extrusion devices in high pressure applications. On the other hand, a "lip" type seal has low initial (breakout) friction, a larger sealing area more tolerant of damage due to abrasion or extrusion and can be fabric reinforced to prevent extrusion in high pressure applications. Although a "lip" type seal is effective when subjected to relatively high fluid pressures, it can be made to work at low fluid pressures only by preloading of the annular sealing portion against the surface to be sealed, for example, by employing springs acting radially against the sealing portion, or by molding the latter with a frusto-conical configuration so that the sealing portion is elastically deformed by contact with the surface to be sealed.

It is an object of the present invention to provide annular seals combining the features of the "squeeze" and "lip" type seals so as to be equally effective in containing fluids under low and high pressures.

Another object is to provide an annular seal which is under a substantial "squeeze" or radial compression, when in its operative position, thereby to contact the surface to be sealed with a considerable radial pressure for resisting the leakage of fluid along that surface, and which responds to the pressure of the fluid to be contained in a manner increasing the radial pressure of the seal against the surface as the pressure of the fluid increases, so that the seal remains effective over a wide range of fluid pressures.

Another object is to provide an annular seal which, in the manner of a "lip" type seal, is urged against the surface to be sealed by the pressure of the contained fluid, and which provides a preloading for effective sealing even at low fluid pressures without resort to the springs or frusto-conical configuration normally employed in "lip" type seals for that purpose, the departure from the frusto-conical configuration being advantageous in that it relieves the usual tension on the active surface of the seal and thereby increases the useful life of the latter.

In accordance with this invention, the foregoing objects are achieved by providing an annular seal of rubber or other suitably resilient, compressible material for preventing leakage of fluid along a cylindrical surface, with the annular seal including a base portion extending normal to the cylindrical surface, and at least one annular sealing portion integral with the base portion generally at right angles to the plane of the latter, said sealing portion having a sealing surface engageable with the cylindrical surface to be sealed, and spaced ribs on the annular sealing portion which are radially compressed when the seal is in its operative position to urge the sealing portion radially against the related cylindrical surface, whereby the pressure or "squeeze" of the annular sealing portion against the cylindrical surface, and hence the characteristics of the seal, under low fluid pressure are determined by the dimensions and placement of the ribs which can be designed to provide the desired sealing characteristics, while the fluid under pressure can act radially against the annular sealing portion between the ribs on the latter to increase the pressure of the sealing portion against the surface to be sealed as the pressure of the fluid to be obtained as correspondingly increased.

One form that the invention may take is an annular rubber seal of U-shaped cross-section opening axially and adapted to be received in a gland around a shaft or the like. A rigid ring fits axially into the space between the legs of the annular seal, and such legs, on their confronting surfaces, are formed with spaced ribs engageable with the rigid ring and compressed radially against the latter when the seal is in its operative position so that the legs of the annular seal are thereby preloaded or urged radially against the gland and shaft. The aforementioned ribs may extend axially and be circumferentially spaced apart, or the ribs may extend circumferentially and be axially spaced apart, so that, in either case, the "squeeze" of the seal is determined by the placement and dimensions of the ribs, while the rigid ring also serves to axially locate the annular rubber seal within the gland.

In another form of the invention, an annular rubber seal is of generally L-shaped cross-section and is made up of a flat, annular base portion, and a generally cylindrical sealing portion extends either from the inner periphery or the outer periphery of the base portion for engagement with a shaft or the inner surface of a cylinder, respectively. In either case, axially extending, radial ribs are provided on the sealing portion at the side of the latter facing away from the surface to be sealed, and are radially compressed when the seal is in its operative position thereby to radially urge the sealing portion against the related shaft or cylinder with a force determined by the placement and dimensions of the ribs which can be preselected to obtain the desired result.

In order that the invention may be fully understood, several illustrative embodiments thereof are hereinafter described in detail with reference to the accompanying drawings, wherein.

Figure 1:
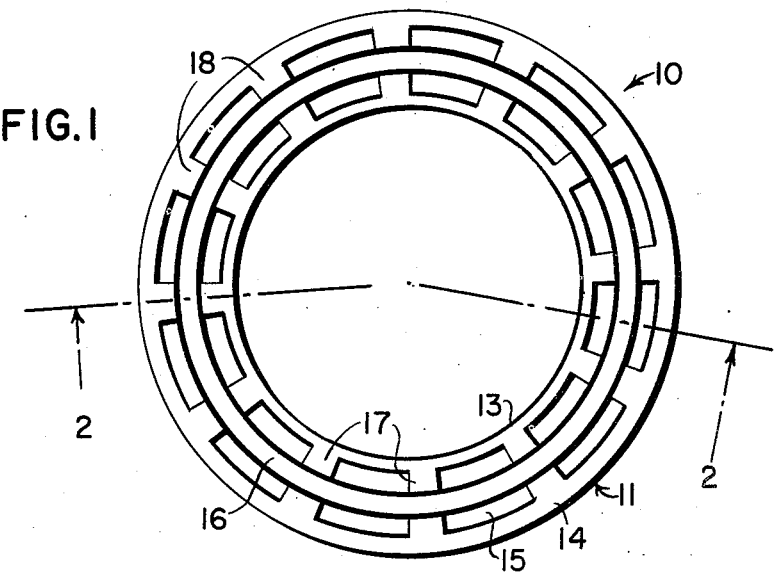
Fig. 1 is an axial plan view of a seal in accordance with a first embodiment of the invention.
Figure 2:
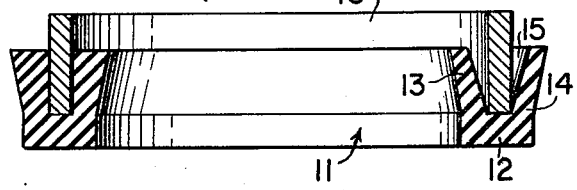
Fig. 2 is a sectional view along the line 2—2 of Fig. 1.

Referring to the drawing in detail, and initially to Figs. 1 and 2 thereof, an annular seal embodying the present invention is there illustrated and generally identified by the reference numeral 10. The seal 10 includes an annular member 11 formed of a resilient, compressible material, for example, of rubber. The annular member 11 is of generally U-shaped cross-section, and is made up of a radially extending base portion 12, and inner and outer annular sealing portions 13 and 14 which extend generally axially from the inner and outer peripheral edges, respectively, of the base portion 12 and are integral with the latter. As seen in Fig. 2, the sealing portions 13 and 14 may diverge in the direction away from the base portion 12, and an annular, axially opening space 15 is defined between the sealing portions 13 and 14.

The seal 10 further includes a rigid, cylindrical ring 16 which extends axially into the annular space 15 and preferably has an axial dimension larger than the axial depth of the space 15 so that the ring 16 will extend out of the space 15.

In accordance with the present invention, the annular sealing portions 13 and 14 are formed with axially extending radial ribs 17 and 18, respectively, which are circumferentially spaced apart, as shown in Fig. 1, and extend into the space 15 so that, normally, the axial, free edges of the ribs 17 and 18 will be closely adjacent to the inner and outer surfaces, respectively, of the ring 16, while the parts of the sealing portions 13 and 14 between the ribs thereon will be spaced radially from the ring 16 by relatively large distances.

Figure 3:
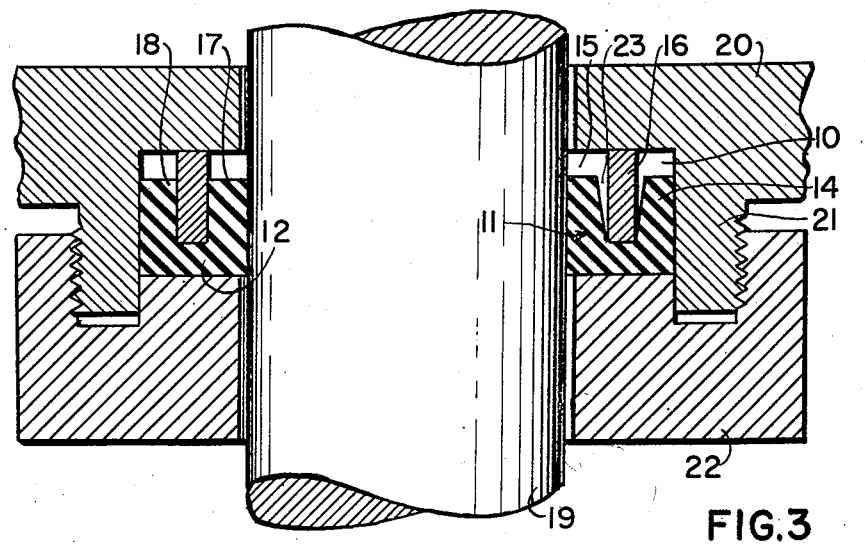
Fig. 3 is a view similar to Fig. 2, but showing the seal arranged within a gland around a shaft.

In Fig. 3, one of the possible applications of the annular seal 10 is illustrated, and the annular seal is there shown employed for the purpose of preventing the leakage of a fluid along the surface of a shaft 19, where such shaft extends through an opening in a housing wall 20. In order to receive the annular seal 10, the housing wall 20 is provided with an external gland housing including a cylindrical projection 21, which is concentric with the opening in the wall 20 and has a larger diameter, and a gland closure 22 threaded on the projection 21 and, with the latter, defining an annular recess 23 around the shaft 19 adapted to receive the seal 10.

The recess 23 is dimensioned so that the radial distance between the surface of the shaft 19 and the parallel bottom of the recess 23 is less than the normal or molded radial distance across the free edges of the sealing portions 13 and 14 of member 11 when the latter is in its undeformed condition. Thus, when the seal 10 is inserted axially into the recess 23 before the latter is closed by the closure 22, the sealing portions 13 and 14, which respectively engage the surface of shaft 19 and the bottom of recess 23, are elastically deformed radially toward each other. However, the ribs 17 and 18, which are normally closely adjacent to the inner and outer surfaces, respectively, of the rigid ring 16, are "squeezed" or radially compressed and yieldably resist such elastic deformation of the sealing portions 13 and 14. Thus, the radial pressures of the sealing portions 13 and 14 against the surface of shaft 19 and the bottom of recess 23, respectively, are determined by the placement and dimensions of the ribs 17 and 18 so that the characteristics of the seal 10 in sealing a low pressure fluid can be preselected, during the designing thereof, by providing the ribs 17 and 18 with the placement and dimensions resulting in the desired sealing characteristics. The rigid ring 16, in addition to providing a solid base against which the ribs 17 and 18 can react, also serves to axially position the member 11 within the recess 23. Thus, when the gland closure 22 is threaded onto the cylindrical projection 21 to close the recess 23, the base portion 12 of the member 11 is firmly gripped between the ring 16 and the closure 22.

It will be seen that the seal 10 is installed within the recess 23 so that the annular space 15 of the seal opens axially in the direction toward the interior of the housing or the like having the fluid under pressure contained therein. Thus, the fluid under pressure leaking along the shaft 19 fills the space 15 and acts radially within that space against the parts of the sealing portions 13 and 14 between the ribs 17 and 18 thereby to urge the portions 13 and 14 radially against the surface of the shaft 19 and the bottom of the recess 23 with forces that are dependent upon the pressure of the fluid to be contained, so that the seal 10 is effective against leakage of the fluid under both low and high pressures.

Although the annular seal 10 has been shown employed as a gland packing in Fig. 3, it is apparent that other uses and applications may be made of the annular seal. Thus, the seal 10 may be employed in any case where it is desired to provide a seal between concentric cylindrical surfaces, so long as one of the cylindrical surfaces is formed with an annular, radially opening recess, corresponding to the recess 23 of Fig. 3, to accommodate the seal 10.

Figure 4:
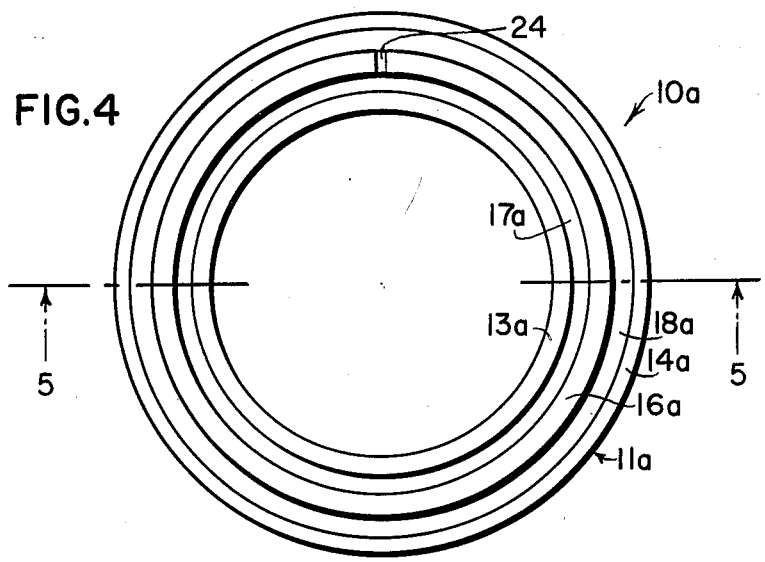
Fig. 4 is an axial plan view of a seal according to another embodiment of the invention.
Figure 5:
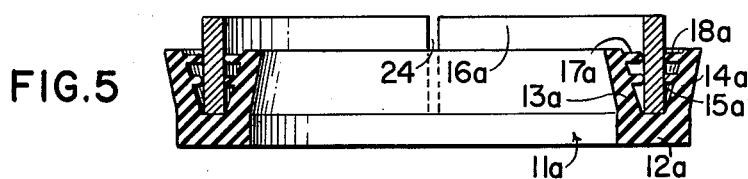
Fig. 5 is a sectional view taken along the line 5—5 of Fig. 4.

Referring now to Figs. 4 and 5 of the drawings, a modification of the seal 10 described above is there shown and generally identified by the reference numeral 10a. The seal 10a is generally similar to the seal 10 of Figs. 1 and 2, and the several parts of the seal 10a are identified by the same reference numerals employed in connection with the corresponding parts of the seal 10, but with the letter "a" appended thereto. Thus, the seal 10a includes an annular member 11a, formed of a resilient, compressible material, such as rubber, and having a radially extending base portion 12a, and axially directed sealing portions 13a and 14a extending along the inner and outer peripheral edges, respectively, of the base portion 12a. As before, the sealing portions 13a and 14a may normally diverge in the direction away from the base portion (Fig. 5), and an annular, axially opening recess 15a is defined between the sealing portions to axially receive a rigid, cylindrical ring 16a.

The sealing portions 13a and 14a are formed with ribs 17a and 18a, respectively, extending or projecting into the annular space 15a and such ribs, in this embodiment of the invention, extend circumferentially on the respective sealing portions and are axially spaced apart. The ribs 17a and 18a are dimensioned so that, when the sealing portions 13a and 14a normally diverge, as in Fig. 5, the free edges of the ribs will be closely adjacent to the inner and outer surfaces of the rigid ring 16a inserted into the space 15a. Thus, when the sealing portions 13a and 14a are elastically deformed radially toward each other, for example, by installation of the seal 10a in a gland structure, of the kind illustrated in Fig. 3, the ribs 17a and 18a are radially compressed and yieldably resist such elastic deformation and thereby determine the pressure of the sealing portions against the cylindrical surfaces with which the latter are in contact. Accordingly, the seal 10a may also be designed to provide any desired low pressure sealing characteristics by suitably placing and dimensioning the circumferential ribs 17a and 18a.

As seen in Figs. 4 and 5, the rigid ring 16a of the seal 10a is preferably axially split to provide a gap 24 between its adjacent end edges so that, when the sealing portions 13a and 14a are elastically deformed toward each other with the circumferential ribs 17a and 18a in tight engagement with the inner and outer surfaces of the ring 16a, air can escape axially out of the annular space 15a through the gap 24, and so that the fluid under pressure to be contained can enter the space 15a and there act radially against the sealing portions, as in a "lip" type seal.

Figure 6:
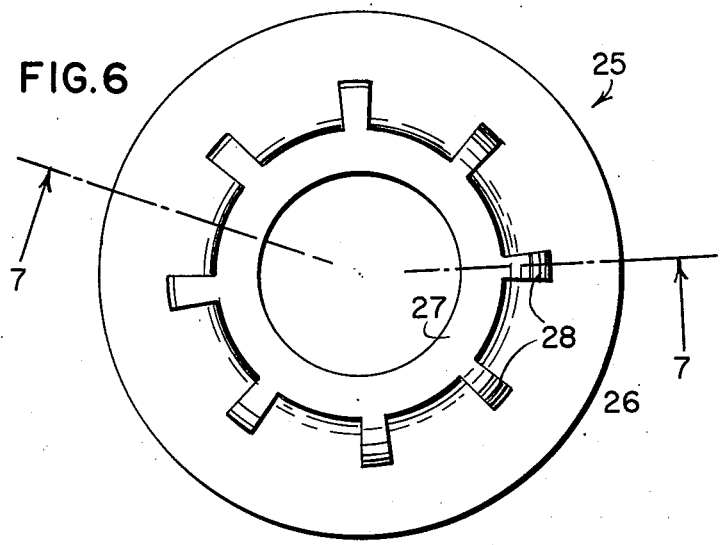
Fig. 6 is an axial plan view of another seal embodying this invention.
Figure 7:
Fig. 7 is a sectional view taken along the line 7—7 of Fig. 6.

Referring to Figs. 6 and 7, an annular seal constructed in accordance with another embodiment of this invention is there illustrated and generally identified by the reference numeral 25. The seal 25 is formed of a resilient, compressible material, for example, of rubber, and includes an annular, substantially flat, radially extending base portion 26, and an annular, generally axially directed sealing portion 27 along the inner peripheral edge of the base portion 26. As seen in Fig. 7, at least the inner surface of the sealing portion 27 may be frusto-conical or tapering in the direction away from the base portion 26. Further, the sealing portion 27 is provided with axially extending, radial ribs 28 which are also integral with the base portion 26 and are disposed at circumferentially spaced apart locations (Fig. 6).

Figure 8:
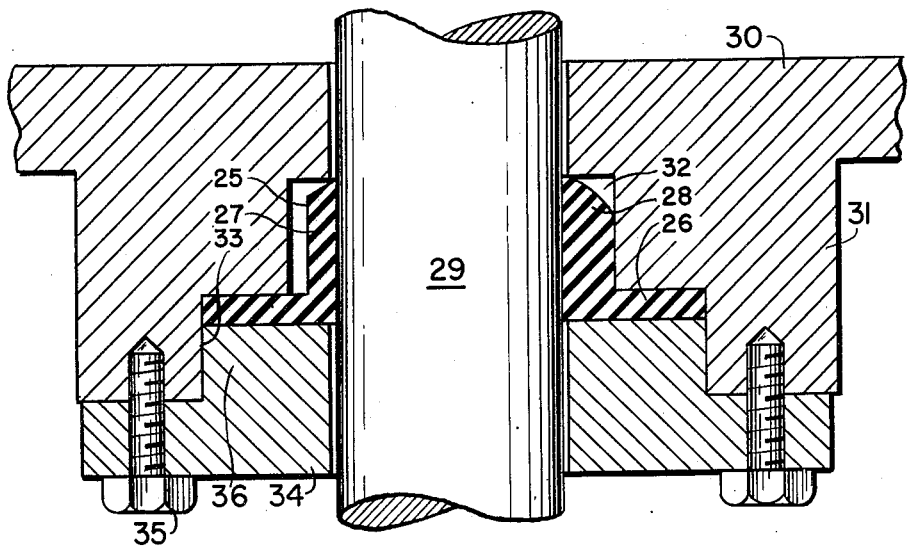
Fig. 8 is a view similar to Fig. 7, but showing the seal arranged around a shaft extending from a housing.

As shown in Fig. 8, by way of example, the seal 25 may be employed to prevent the leakage of fluid along the surface of a shaft 29 where the shaft extends through an opening in a housing wall 30. In order to accommodate the seal 25, the wall 30 has a hollow boss 31 on its outer surface concentric with the shaft 29, the boss 31 having a stepped bore therethrough defining an annular recess 32 to receive the sealing portion 27, and an enlarged annular recess 33 in which the base portion is adapted to fit. A closure plate 34 is secured on the boss 31, as by the bolts 35, and includes an annular extension 36 which fits into the recess 33 to clamp the base portion of the seal against the bottom of recess 33.

The recess 32 of boss 31 is radially dimensioned so that the ribs 28 on the sealing portion will be radially "squeezed" or compressed between the surface of shaft 29 and the cylindrical surface of the recess, thereby preloading the sealing portion 27 radially against the shaft 29, while clearance is provided around the parts of sealing portion 27 between the ribs 28 (as shown in the left hand portion of Fig. 8) so that the fluid under pressure leaking around the shaft 29 can act radially inward within said clearance against sealing portion 27 to urge the latter against the shaft with a force dependent upon the pressure of the fluid to be contained.

Figure 9:
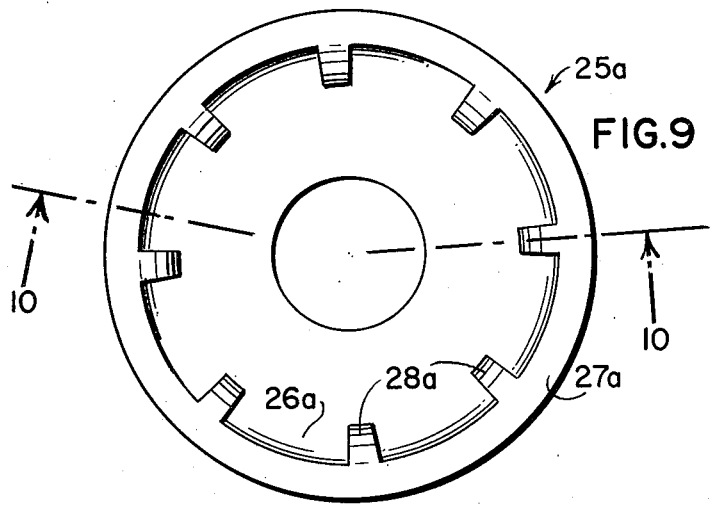
Fig. 9 is an axial plan view of still another seal embodying this invention.
Figure 10:
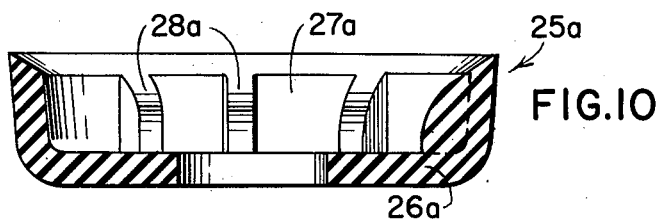
Fig. 10 is a sectional view taken along the line 10—10 of Fig. 9.

Referring now to Figs. 9 and 10 of the drawings, an annular seal constructed in accordance with still another embodiment of the invention is there illustrated and generally identified by the reference numeral 25a. The seal 25a is a modification of the seal described in connection with Figs. 6 and 7, and the several parts of the seal 25a are identified by the same reference numerals employed in connection with the description of the seal 25, but with the letter "a" appended thereto. Thus, the seal 25a, which is formed of a resilient, compressible material, includes a radially directed, substantially flat, annular base portion 26a having an axially directed annular sealing portion 27a extending along its outer peripheral edge. The sealing portion 27a may have at least its outer surface normally frusto-conical or tapering in the direction toward the base portion 26a, and axially extending, radially directed ribs 28a are formed on the inner surface of the sealing portions 27a at circumferentially spaced apart locations and are integral with the base portion 26a.

Figure 11:
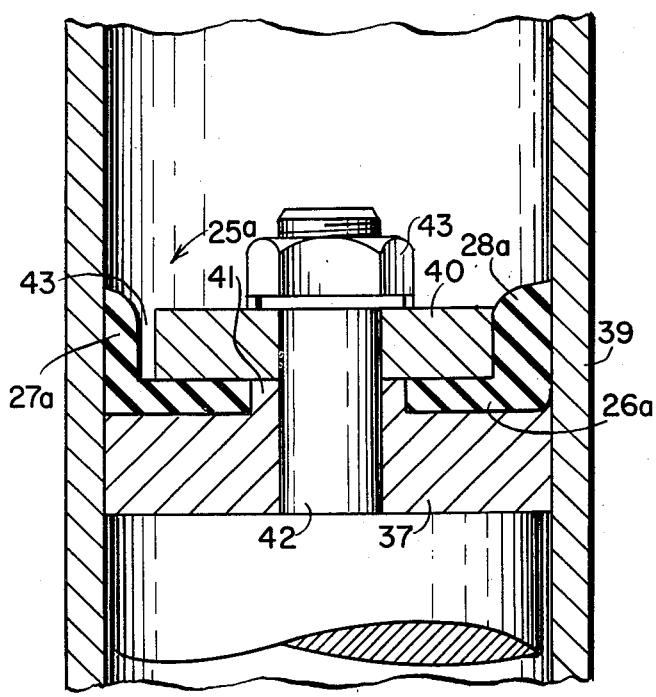
Fig. 11 is a view similar to Fig. 10, but showing the seal employed on the piston of an air pump.
Figure 11:
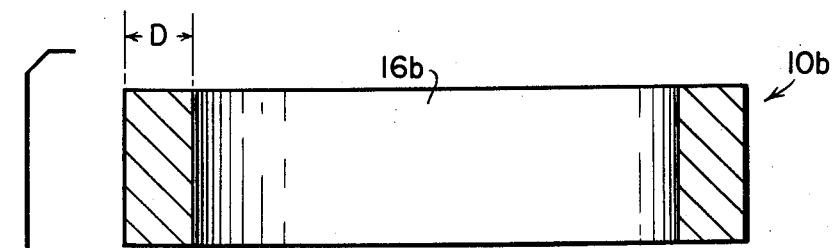

As shown in Fig. 11, the seal 25a is adapted, merely by way of example, to be employed on the piston of an air pump. When so employed, the base portion 26a of the seal is clamped between a backing plate 37 on a piston 38 reciprocating within a cylinder 39 and a follower plate 40. Preferably, the backing plate 37 has a hub 41 through which a stud 42 extends axially from the piston 38, and a nut 43 threaded on the stud holds the assembly together, while the hub 41 prevents overtightening of the nut and consequent damage to the base portion of the seal. The backing plate 37, which has a small clearance between its periphery and the inner surface of cylinder 39, is for the purpose of preventing extrusion of the seal 25a into the clearance around the piston 38 when the clearance around the latter is relatively large.

The follower plate 40 is dimensioned so that the ribs 28a of the seal are radially compressed or "squeezed" between the periphery of plate 40 and the inner surface of cylinder 39, whereby the sealing portion 27a is preloaded against the cylinder, while a substantial clearance 43 exists between the periphery of plate 40 and the parts of sealing portion 27a between the ribs 28a so that the fluid under pressure can enter the clearance 43 and act radially outward against such parts of the sealing portion 27a to urge the latter against the cylinder surface with a force dependent upon the pressure of the fluid being pumped.

In each of the above described embodiments, the sealing portion or portions of the annular seal have been shown molded with a frusto-conical surface so that such surface is elastically deformed by contact with the related cylindrical surface to be sealed and the preloading of the sealing portion or portions is in part due to the elastic deformation thereof. However, since the ribs provided on the sealing portion or portions in accordance with this invention can be dimensioned and spaced to provide any desired degree of preloading, it is apparent that the frusto-conical configuration is not necessary and the sealing portion or portions may be molded with cylindrical surfaces to avoid the creation of tension stresses in such surfaces when the seal is in its operative position. This absence of tension stresses in the surfaces of the seals contacting the surfaces to be sealed serves to substantially decrease the wear on the seal, and therefore to increase the useful life of the seals.

Figure 12:
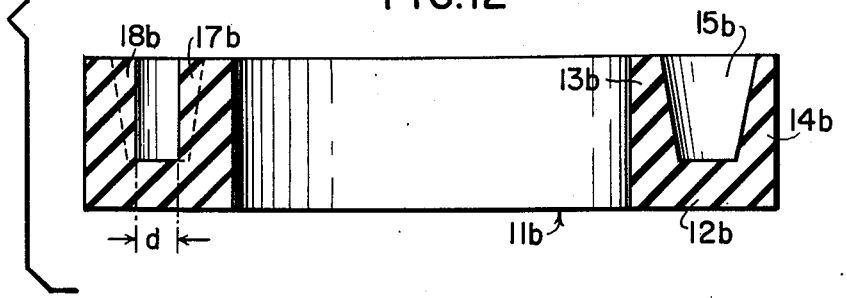
Fig. 12 is a view similar to Fig. 2, but showing a modified form of that embodiment.

Referring to Fig. 12, a modified form of the seal illustrated in Figs. 1, 2 and 3 is there shown and generally identified by the numeral 10b. The seal 10b includes an annular rubber member 11b which is of U-shaped cross-section and has a radially extending annular base portion 12b and inner and outer annular sealing portions 13b and 14b. The sealing portions 13b and 14b are parallel, define an annular space 15b therebetween into which a cylindrical, rigid ring 16b is adapted to extend. Further, in accordance with this invention, the annular sealing portions 13b and 14b are formed with axially extending ribs 17b and 18b which are circumferentially spaced apart and project into the space 15b. As seen in Fig. 12, the normal distance $d$ between the confronting edges of the ribs 17b and 18b is smaller than the thickness $D$ of the ring 16b. Thus, when the seal 10b is fitted into a gland structure of the kind shown in Fig. 3, wherein the radial depth of the recess 23 is substantially equal to the molded distance between the inner and outer surfaces of the sealing portions 13b and 14b, respectively, the ring 16b radially compresses or "squeezes" the ribs 17b and 18b to preload the sealing portions against the shaft 19 and the cylindrical surface at the bottom of recess 23, while the fluid under pressure can still enter between the ring 16b and the parts of sealing portions 13b and 14b located between their respective ribs to urge the sealing portions radially against the related cylindrical surfaces to be sealed.

Although the above described modification has been related particularly to a seal of the type shown in Figs. 1 and 2, it is to be understood that the various other seals embodying this invention can be similarly modified for the same purpose.

It should be noted that the resilient, compressible members of the several described and illustrated embodiments of this invention can be molded with layers of cloth embedded therein, or disposed at the surfaces thereof, in order to resist extrusion of the resilient, compressible member of the seal into the clearance around the cylindrical surface to be sealed when the seal is subjected to high fluid pressures.

It will be apparent that all of the seals embodying this invention combine features of seals of the "squeeze" and "lip" types, in that, the seals are radially compressed when in their operative positions to effectively prevent leakage of a fluid under low pressure, and are pressed radially against the surface or surfaces to be sealed with forces dependent upon the pressure of the fluid to be contained, thereby effectively preventing leakage of a fluid under high pressure.

Although various embodiments of the invention have been described in detail and shown in the accompanying drawings, it is to be noted that the invention is not limited to these precise embodiments, and that various changes and modifications may be effected therein without departing from the scope or spirit of the invention as defined in the appended claims.

What is claimed is:

1. A seal for preventing leakage of fluid along a cylindrical surface, said seal comprising a resilient, compressible member having an annular base portion lying in a generally flat plane at right angles to said cylindrical surface, at least one annular sealing portion integral with said base portion along a related one of the peripheral edges of the latter for sealing engagement with said cylindrical surface, spaced ribs extending from said sealing portion at the side of the latter facing away from the cylindrical surface for engagement by a continuous annular backup surface so that said ribs are radially compressed to urge the related sealing portion radially against the cylindrical surface, while the fluid to be contained can act against said sealing portion between said ribs and urge the sealing portion against the cylindrical surface with a force dependent upon the pressure of the fluid, said resilient, compressible member being of U-shaped cross-section and defining an annular space opening axially between said one annular sealing portion and another annular, generally axially extending portion integral with said base portion along the other peripheral edge of the latter, said other axially extending annular portion also having spaced ribs extending into said annular space; said means defining a back-up surface including a rigid ring fitting into said annular space and engaged, at its opposite sides, by said spaced ribs on said sealing portion and said other axially extending portion, respectively, so that said ribs are radially compressed against said ring and urge said sealing portion and other axially extending portion in opposed radial directions, said ribs on the sealing portion and on the other axially extending portion of the resilient, compressible member extending circumferentially and being axially spaced apart, and said rigid ring having axially extending recesses in the inner and outer surfaces thereof to permit the escape of air from, and the entry of fluid under pressure into, said annular space past said ribs.

2. A seal according to claim 1; wherein said rigid ring is axially split and has a gap between the ends thereof to define said axially extending recesses in the inner and outer surfaces of the rigid ring.

3. A seal for preventing the leakage of fluid between two concentric cylindrical surfaces, one of which has an annular, radially opening recess to receive and axially locate the seal; said seal comprising an annular resilient, compressible member including a radially directed, annular base portion and inner and outer, axially directed, annular sealing portions integral with said base portion along the inner and outer peripheral edges of the latter so that an axially opening annular space is defined between said sealing portions, said resilient, compressible member being dimensioned so that the opposed surfaces of said sealing portions are held in parallel relationship by engagement with the bottom of the recess and the other cylindrical surface, respectively, said sealing portions having spaced ribs extending into said annular space, and a rigid ring extending into said annular space between said ribs and engaged at its opposite sides by said ribs to radially compress the latter when said opposed surfaces of the sealing portions engage the bottom of the recess and the other cylindrical surface so that said sealing portions are thereby preloaded, said ribs extending circumferentially on said sealing portions and being axially spaced apart, and said rigid ring being axially split to define an axially extending gap between its adjacent ends so that the fluid to be contained can enter said annular space through said gap and act within said space radially against said sealing portions to urge the latter apart.

References Cited in the file of this patent
UNITED STATES PATENTS

| | | |
|---|---|---|
| 1,868,668 | Mahon | July 26, 1932 |
| 2,019,523 | Davies | Nov. 5, 1935 |
| 2,149,294 | Huck | Mar. 7, 1939 |
| 2,275,935 | Baker | Mar. 10, 1942 |
| 2,465,175 | Schwarz et al. | Mar. 22, 1949 |
| 2,660,459 | Collins | Nov. 24, 1953 |

FOREIGN PATENTS

| | | |
|---|---|---|
| 480,116 | Great Britain | Feb. 17, 1938 |
| 561,321 | Great Britain | May 15, 1944 |